United States Patent [19]

Lasberg et al.

[11] Patent Number: 4,687,941
[45] Date of Patent: Aug. 18, 1987

[54] GLOVE BOX

[75] Inventors: Ingo Lasberg, Alzenau; Wolf-Günther Druckenbrodt, Rodenbach, both of Fed. Rep. of Germany

[73] Assignee: Alkem GmbH, Hanau, Fed. Rep. of Germany

[21] Appl. No.: 690,155

[22] Filed: Jan. 10, 1985

[30] Foreign Application Priority Data

Jan. 11, 1984 [DE] Fed. Rep. of Germany ....... 3400719

[51] Int. Cl.⁴ ............................................. G21F 5/00
[52] U.S. Cl. ................. 250/506.1; 137/635; 901/38; 414/591
[58] Field of Search ................ 250/506.1; 901/16, 38; 414/8, 590, 591; 254/129.04, 129.11; 137/635, 377, 382, 384

[56] References Cited

U.S. PATENT DOCUMENTS

| | | | |
|---|---|---|---|
| 3,150,688 | 9/1964 | Costes | 137/635 |
| 3,439,552 | 4/1969 | King et al. | 137/635 |
| 3,973,683 | 8/1976 | Keller | 414/591 |
| 4,001,556 | 1/1977 | Folchi et al. | 901/38 |
| 4,229,136 | 10/1980 | Panissidi | 901/16 |
| 4,274,802 | 6/1981 | Inaba et al. | 414/591 |

Primary Examiner—Bruce C. Anderson
Attorney, Agent, or Firm—Herbert L. Lerner; Laurence A. Greenberg

[57] ABSTRACT

A glove box with tubular lines for harmful fluids and with shutoff valves inserted in the tubular lines and, respectively, formed of an actuating member and a valve body includes an exterior wall forming part of the glove box, the shutoff valves being disposed adjacent one another on the wall, the valve bodies of the shutoff valves being located on the inside of the exterior wall, and the actuating members of the valve bodies being located on the outside of the exterior wall; and a drive for driving the actuating members also located on the outside of the exterior wall and having a device for docking with the respective actuating members, the drive means being guidably displaceable in a plane parallel to said exterior wall to the respective actuating members for docking with the respective actuating members.

6 Claims, 6 Drawing Figures

GLOVE BOX

The invention relates to a glove box with tubing and/or hose lines for radioactive and/or toxic liquids or gases and with shutoff valves which are inserted into these tubing and/or hose lines and which, respectively, include an actuating member with a drive device and a valve body.

Such a glove box is already known and in use. In this heretofore known glove box, not only the tubing and/or hose lines, but also the shutoff valves and the corresponding actuating members as well as the drive devices are arranged in the glove box.

The liquids or gases in the tubing or hose lines are not only radioactive or toxic, but also frequently corrosive. Therefore, the drive devices, especially, which are generally electric or pneumatic servomotors, must be protected by special housings of corrosion-resistant material such as alloy steel, in order to prevent these drive devices from being damaged or even destroyed by escaping liquids or gases upon the occurrence of leaks in the tubing or hose lines.

Further requirements are electric power supply and acknowledgement lines which lead to the drive devices in the glove box and also extend out of the glove box. These electric lines are not only subject to corrosion, but they also become embrittled under the influence of radioactive radiation and must therefore be constructed as corrosion and radiation-resistant cables with an insulating jacket of special insulating material. Furthermore, the bushings or lead-ins for these cables through the wall of the glove box must be sealed specially.

It is accordingly an object of the invention to provide a glove box which avoids corrosion-sensitive parts which would otherwise require intensive servicing.

With the foregoing and other objects in view, there is provided, in accordance with the invention, a glove box with tubular lines for harmful fluids and with shutoff valves inserted in the tubular lines and, respectively, formed of an actuating member and a valve body, comprising an exterior wall forming part of the glove box, the shutoff valves being disposed adjacent one another on the wall, the valve bodies of the shutoff valves being located on the inside of the exterior wall, and the actuating members of the valve bodies being located on the outside of the exterior wall; and drive means for driving the actuating members also located on the outside of the exterior wall and having a device for docking with the respective actuating members, the drive means being guidably displaceable, in a plane parallel to the exterior wall, to the respective actuating members for docking with the respective actuating members.

The actuating members of the shutoff valves are brought to the outside through the wall of a glove box. The bushings or lead-ins for these actuating members can be made gas and liquid-tight without difficulty. Drive devices for these shutoff valves need not be located at all inside the glove box. Only a single drive device, for which no special corrosion-resistant housing is required, need be provided on the outside of the wall of the glove box for the drive members of a plurality of shutoff valves. The travel of the drive devices to the actuating member of the individual shutoff valves and the adjustment of these actuating members by this drive device can be controlled by an electronic control device in such a manner that the liquids or gases are distributed in accordance with a defined program to the individual tubing or hose lines in the glove box. If necessary, the actuating members of the shutoff valves can even be adjusted manually without requiring operating personnel to perform any work inside the glove box and without any endangerment from radioactive radiation.

The connection of the individual shutoff valves to one another by the tubing or hose lines in the glove box can be effected with especially good visibility if, in accordance with another feature of the invention, the tubular lines include rectilinear main tubes whereon the valve bodies are seated, the main tubes extending spaced from and parallel to one another on the inner surface of the exterior wall. The main tubes may be in the form of feed lines or collecting tubes which are brought, for example, through the wall of the glove box to tanks located outside the glove box. In addition, the main tubes can be constructed as tube plates which are formed with bores and constitute a quite well-defined circulatory loop for the distribution of the liquids or gases flowing through therethrough. The shutoff valves can be assembled close together on these tube plates especially easily.

In accordance with a further feature of the invention, the drive means comprise a sensor for detecting the setting of a respective actuating member and for adjusting the setting of the docking device for docking with the actuating member at the respective setting.

In accordance with an added feature of the invention, the docking device comprises a sensor for detecting a proper docking of the drive means with the actuating member.

In accordance with an additional feature of the invention, the fluids are radioactive.

In accordance with a further feature of the invention, the fluids are toxic.

In accordance with again another feature of the invention, the tubular lines are tubes.

In accordance with a concomitant feature of the invention, the tubular lines are hose lines.

Other features which are considered as characteristic for the invention are set forth in the appended claims.

Although the invention is illustrated and described herein as embodied in a glove box, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
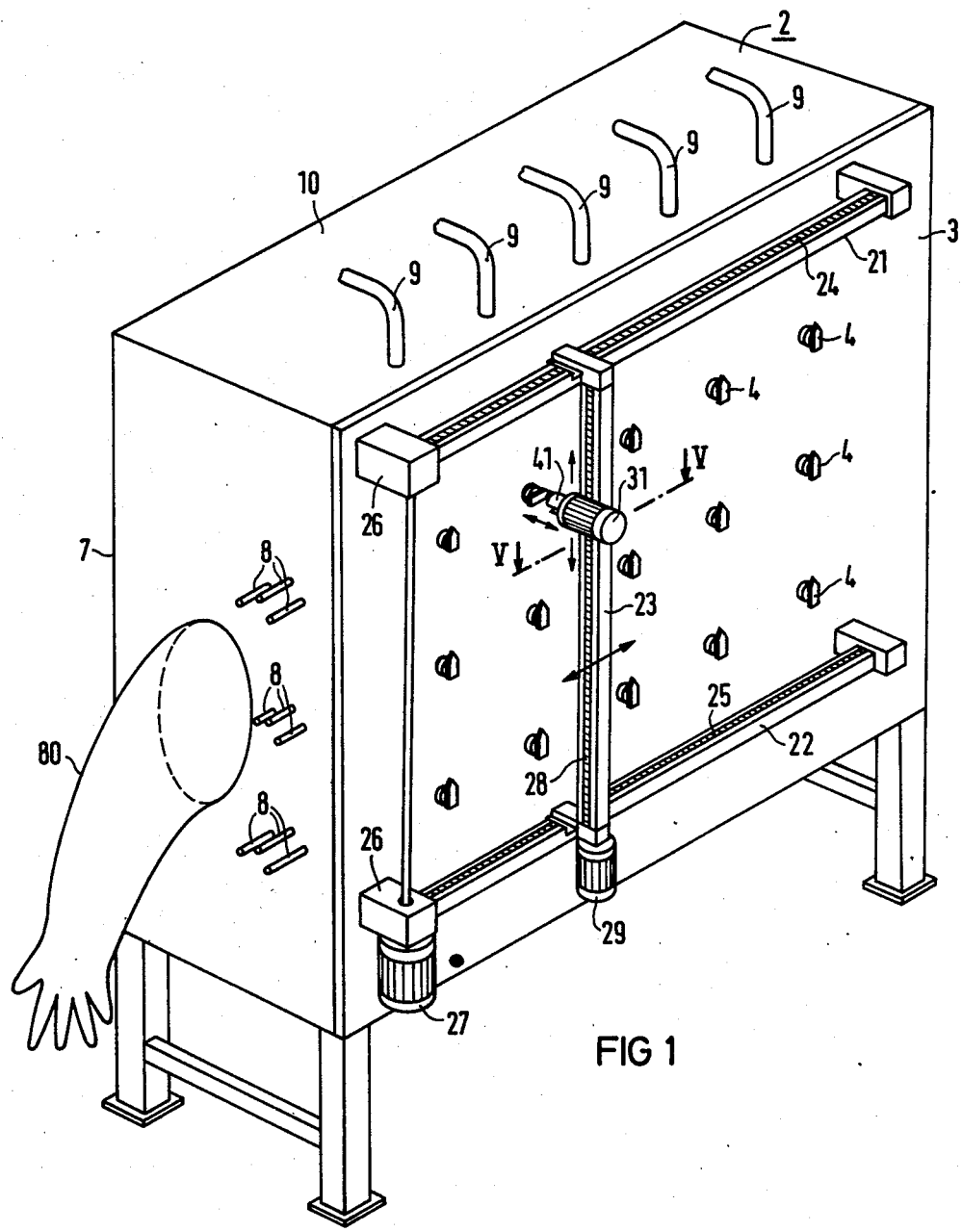
FIG. 1 is a front, side and top perspective view of a glove box according to the invention.
Figure 2:
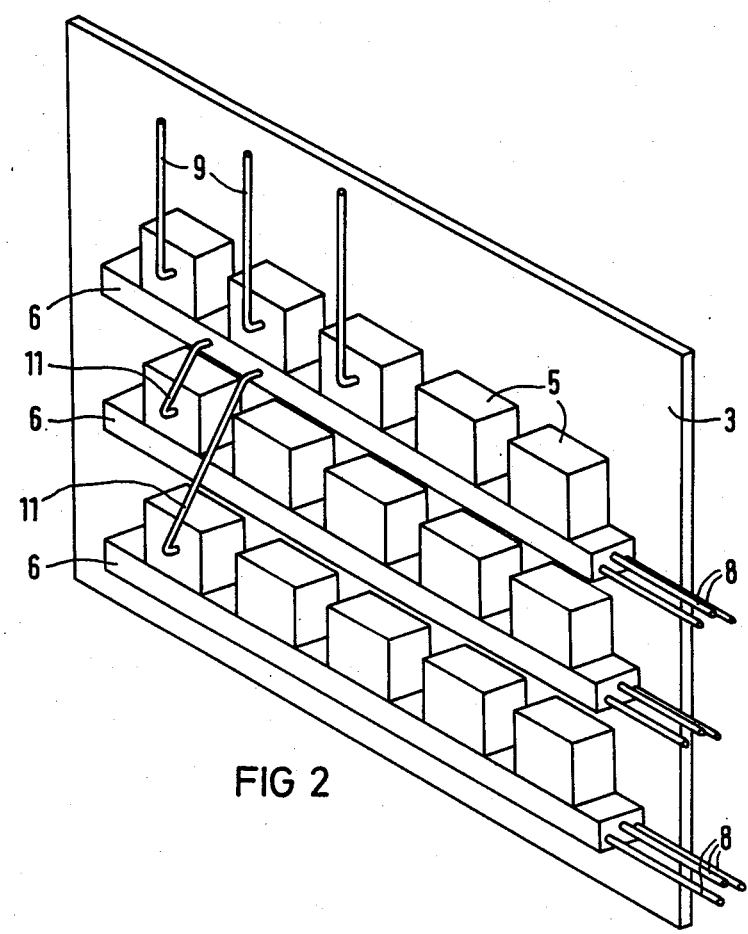
FIG. 2 is a rear, side and top perspective view of the front wall of the glove box according to FIG. 2, together with the equipment secured thereto.
Figure 3:
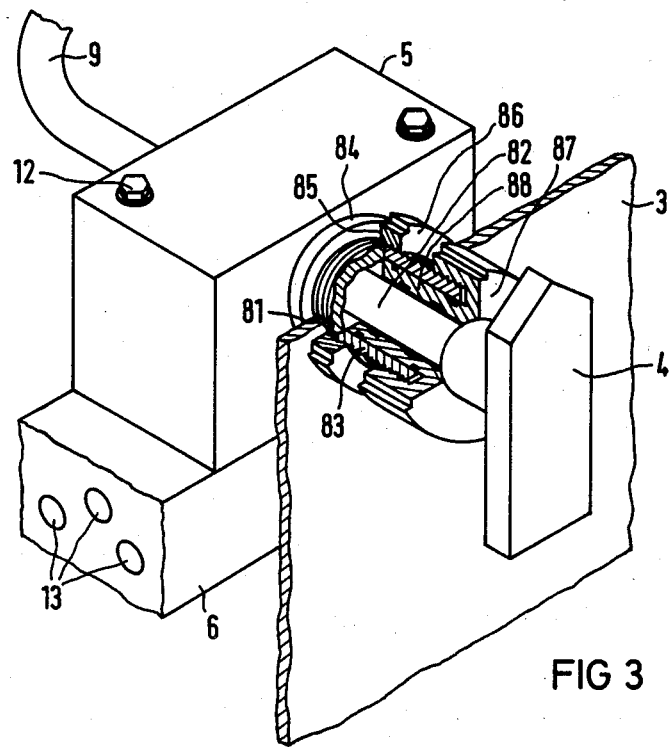
FIG. 3 is a much enlarged fragmentary perspective view of FIG. 1 showing partly broken away and in section a shutoff valve of the glove box.

Referring now to the drawing and first, particularly, to FIGS. 1 and 2 thereof, there is shown a glove box 2 having a side wall 7 with a feedthrough for a glove 80 for working inside the glove box 2. Shutoff valves are mounted on a front wall 3 and are respectively formed of an actuating member 4 of ferromagnetic material and a valve body 5 formed of metal and located on the inside of the front wall 3 i.e. within the glove box 2. The valve bodies 5 are divided into three groups of five each, and each group is seated on one of three straight mutually parallel main tubes 6 which are arranged horizontally spaced from one another, and are firmly connected, for example, by screws or bolts to the inside of the front wall 3 which is formed of metal. As is shown in FIG. 3, an actuating shaft 82 of a shutoff valve extends through a feed-through or bushing 81 in the front wall 3. The actuating shaft 82 is formed of metal and extends from a valve body 5 of the shutoff valve and carries the actuating member 4 on the outside of the front wall 3.

The actuating shaft 82 extends through a nozzle or connecting piece 83 which is formed of metal, is attached to the valve body 5, has an external thread and extends through the feed-through or bushing 81 to the outside of the front wall 3. On the valve body 5, there is formed around the nozzle 83, a metal bead 84 which rests flush against the inside of the front wall 3. Between the metal bead 84 and the inside of the front wall 3, there is located a sealing ring 85 coaxial with the nozzle 83, on which, at the outside of the front wall 3, a metal slotted nut 86 is mounted, by which the metal bead 84 is firmly clamped against the front wall 3, so that the feed-through 81 is gas and liquid-tightly sealed.

On the outside, another slotted nut 87 is screwed onto the end of the nozzle or connecting piece 83 on the outside of the front wall 3. The slotted nut 87 is constructed as a sealing element and is provided as such with a hollow cylinder 88, through which the actuating shaft 82 extends and with which this slotted nut 87 engages in the nozzle or connecting piece 83. Between the inner cylindrical surface of the nozzle 83 and the outer cylindrical surface of the hollow cylinder 88, as well as between the cylindrical surface of the actuation shaft 82 and the inner cylindrical surface of the hollow cylinder 88, two so-called O-rings are respectively arranged as sealing rings coaxially to the nozzle or connecting piece 83 with mutual spacing, so that the nozzle 83 is also sealed on the inside in a gas and liquid-tight manner.

The slotted nut 87 with the hollow cylinder 88 may be formed of electrically insulating plastic material and have, at the end face of the hollow cylinder 88 facing towards the valve body 5, a metal coating which is provided with a non-illustrated electric lead extending in axial direction through the wall of the hollow cylinder 88 to the outside. Such a metal coating with an electric lead forms a leakage testing probe having an ohmic and/or capacitive resistance to the metal parts of the glove box 2 which drops or decreases if solution should escape at a leak between the actuating shaft 82 and the valve body 5.

The actuating members of all of the shutoff valves are of identical construction and are formed, respectively, of a handle which is of strip-like shape and terminates at one end in the shape of a wedge. Such a handle is attached, respectively, to the end of an actuating shaft 82, perpendicularly to the longitudinal axis of the actuating shaft 82 on the outside of the front wall 3 and outside or beyond the nozzle or connecting piece 83. The radial spacing of the tip of the wedge-shaped end of this handle relative to the longitudinal axis of the actuating shaft 82 is smaller than the radial spacing of the two corners at the other end of this handle with respect to that longitudinal axis. The actuating members 4 on the outside of the front wall 3, like the valve bodies 5 on the inside of the front wall 3, are arranged in groups of five each in three respective horizontal, mutually parallel straight lines.

At the ends of the main tubes 6 formed by tube plates, line tubes 8 extend to the outside through a side wall 7 of the glove box 2, and line tubes 9 extend to the outside from the rear of the valve bodies 5 through the cover or top wall 10 of the glove box 2. Furthermore, the main tubes 6 are connected to one another or to connecting nozzles on valve bodies 5 via connecting tubes 11 which are located on the inside of the front wall 3 i. e. inside the glove box 2.

The valve bodies 5 are of parallelepipedal construction and, respectively, rest flush with the bottom surface thereof against the cover surface of the main tubes 6 constructed as tube plates. As shown in FIG. 3, they are bolted to these tube plates by hex-head screws 12, which are not countersunk.

Figure 4:
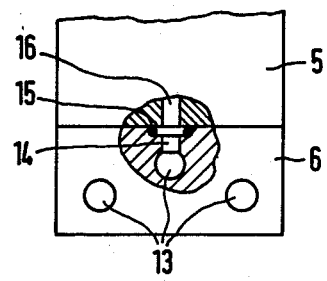
FIG. 4 is a fragmentary side elevational view of FIG. 3 showing, in section, a detail of the shutoff valve.

Through the main tubes 6, which are constructed as tube plates, there extend three longitudinal bores 13 as channels which can be readily seen in FIGS. 3 and 4. In FIG. 4 there can be seen such a longitudinal bore 13 from which a connecting bore 14 extends which is perpendicular to this longitudinal bore 13 and to the cover surface of the tube plate forming the main tube 6 and which ends at the cover surface of this tube plate, which forms the side of this tube plate which is sealed with a valve body 5. A sealing ring 15 engages in the cover area of the tube plate and surrounds the connecting bore 14. Aligned with the connecting bore 14 in the tube plate forming the main tube 6 is a connecting bore 16 having the same inner diameter and being located in the parallelepipedal valve body 5 according to FIG. 4.

On the outside of the front wall 3 of the glove box 2, as shown in FIG. 1, there are further arranged two mutually spaced, rectilinear guide tracks or rails 21 and 22 which are parallel to one another and to the main tube 6 on the inside of the front wall 3, and between which the actuating members 4 for the shutoff valves are disposed. On these guide rails 21 and 22, there is mounted a slider 23 which can travel on the guide rails 21 and 22. In each of the two guide rails 21 and 22, a respective drive spindle 24, 25 is mounted which is parallel to these guide rails 21 and 22, both of the spindles 24 and 25 engaging the slider 23 via a corresponding nut. Both drive spindles 24 and 25 are driven via miter gears 26 by the same electric motor 27 and can reciprocate the slider 23 along the guide rails 21 and 22.

In the slider 23 per se, a drive spindle 28 is mounted which is disposed at right angles to the drive spindles 24 and 25 supported in the guide rails 21 and 22 and with which an electric motor 29 mounted on the slider 23 for driving the latter is associated. The slider 23 simultaneously represents a rectilinear guide rail at right angles to the guide rails 21 and 22, for a driving device 31 which is engaged by the drive spindle 28 in the slider 23 via a nut and is associated with the actuating members 4 of the shutoff valves. This drive device 31 is thus guided by means of the electric motors 27 and 29 in the wall plane of the front wall 3 so as to be movable to the actuating members 4.

Figure 6:
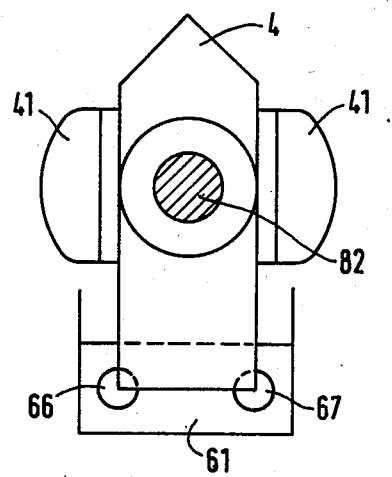
FIG. 6 is a cross-sectional view of FIG. 5 taken along the line VI—VI in direction of the arrows.
Figure 5:
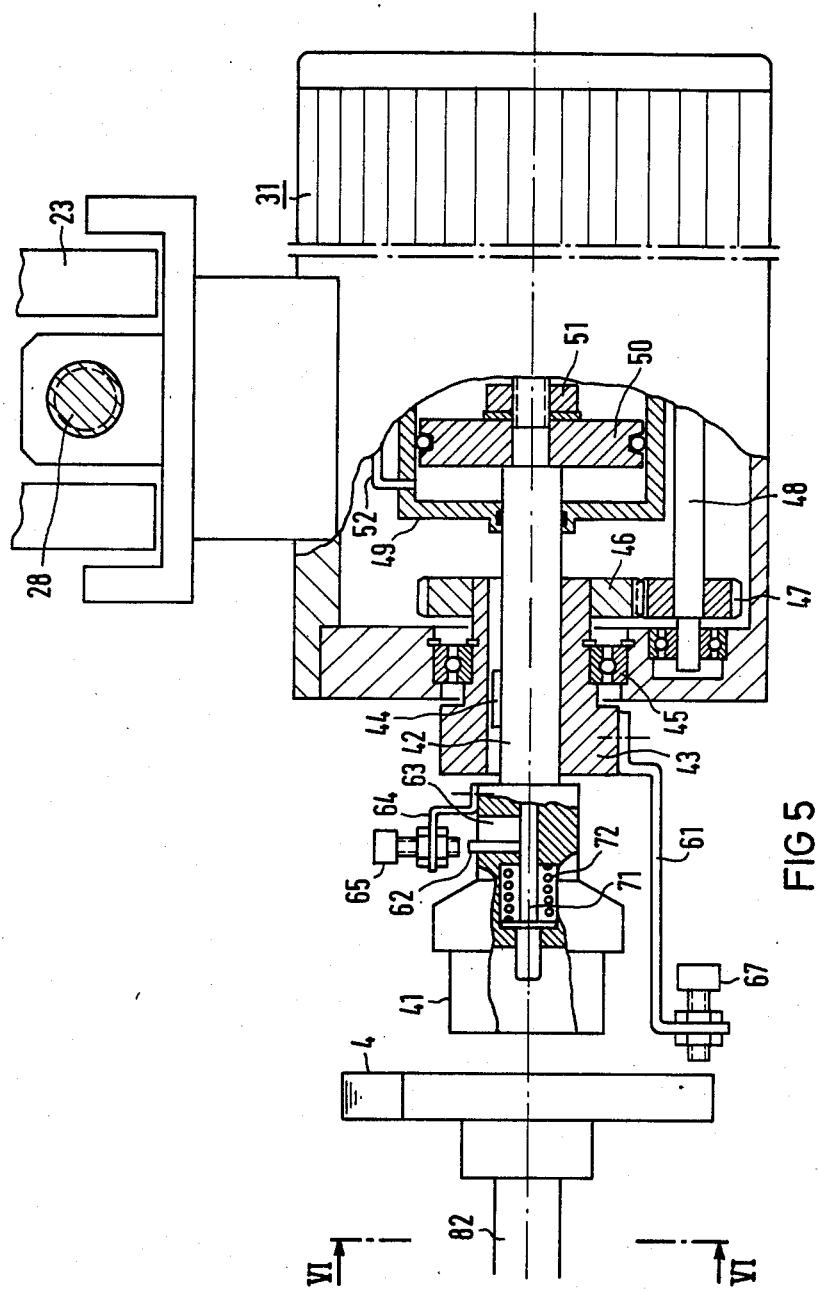
FIG. 5 is a much enlarged fragmentary sectional view of FIG. 1 taken along the line V—V in direction of the arrows.

As shown in FIGS. 5 and 6, the driving device 31 has a claw 41 which serves as a device for docking this driving device 31 with an actuating device 4. This claw 41 is mounted at the end of a shaft 42 perpendicularly to the front wall 3 of the glove box 2. This shaft is mounted so as to be movable in longitudinal direction thereof, in a coaxial hub 43, with which it is coupled, secured against rotation, via an entrainer 44. The hub 43 is mounted for rotation about the longitudinal axis of the shaft 42 in the housing of the driving device 31 via ball bearings 45. On the inside of the housing of the driving device 31, a gear 46 is mounted on the hub 43, secured against rotation, and coaxial with the longitudinal axis of the shaft 42. This gear 46 meshes with the drive gear 47 which is mounted on a ball bearing-supported shaft 48 in the housing of the driving device 31, the shaft 48 being driven by a non-illustrated electric positioning motor or servomotor of the driving device 31.

In the housing of the driving device 31, there is further arranged at the other end of the shaft 42, a pneumatic cylinder 49 which is rigidly connected to the housing of the driving device 31. The shaft 42, which is rotatable as well as shiftable in longitudinal direction thereof, extends sealingly through a cover at the cylinder head and is connected tensionally to a piston 50 in the cylinder 49 i.e. is threadedly secured by a nut 31, for example. A respective pneumatic control line terminates in the interior of the cylinder 49 on both sides of the piston 50. Only one control line 52 of these two control lines is visible in the drawing. By appropriately admitting compressed air to the pneumatic control lines, the shaft 42 can be reciprocated in longitudinal direction thereof.

To the hub 43, there is threadedly secured a support or beam 61, on which there are mounted two inductive sensors 66 and 67 for detecting the position or setting of the actuating member 4 of a shutoff valve and for adapting or matching the position or setting of the device with the jaw 41 for docking with the actuating member 4 to this position or setting. These sensors 66 and 67 lie on a circle in a plane perpendicular to the longitudinal axis of the shaft 42 around the point of penetration of the longitudinal axis of the shaft 42 through this plane. The radius of this circle is equal to the spacing of the two corners of the actuating member 4 constructed as a strip-shaped handle at the wide end thereof, from the axis of rotation of the actuating shaft 82 of the respective shutoff member, if this actuating shaft 82 is aligned with the shaft 42.

In the center of the claw 41, a control pin 71 mounted so as to be slidable in longitudinal direction thereof is aligned with the shaft 42.

The control pin 71 has at one end thereof a cam 62 of ferromagnetic material which extends perpendicularly to the longitudinal axis of the shaft 42 and is located in a longitudinal slot 63 of the claw 41. Opposite this longitudinal slot 63, there is fastened to the outside at the claw 41, a support or beam 64 with another inductive sensor 65 for detecting or ascertaining proper docking of the driving device 31 with actuating member 4. The other end of the control pin 71 protrudes between the two halves of the claw 41 and can be moved against the pressure of the coil spring 72 into the claw 41 in longitudinal direction of the shaft 42.

For docking the driving device 31 with a respective actuating member 4, the driving device 31 is positioned, in control dependency of a non-illustrated control device which is connected to the inductive sensors 65, 66 and 67 and with which an incremental pickup is associated, so that the actuating shaft 82 is aligned with the shaft 42 of the driving device 31. Then, the shaft 42 is rotated to such an extent, in control dependency of the control device, that the wide end of the actuating member 4 constructed as a handle is located between the two inductive sensors 66 and 67. Then, compressed air is admitted to the pneumatic control lines of the cylinder 49, so that the shaft 42 moves in longitudinal direction towards the actuating member 4, and this actuating member 4, constructed as a handle, comes to lie between the two claw halves of the claw 41. Finally, this actuating member 4, constructed as a handle, moves the control pin 71 into the claw 41 so that the inductive sensor 65 responds and the servomotor of the driving device 31 rotates the actuating member 4 into the new desired position or setting via the shaft 42.

After this new desired setting or position is reached, a non-illustrated inductive sensor which is associated with the respective shutoff valve signals the control device so that the electric positioning motor or servomotor of the driving device 31 is switched off, compressed air is accordingly admitted to the pneumatic control lines of the cylinder 49, the shaft 42 is displaced in longitudinal direction away from the actuating member 4, and the claw 41 is disengaged from the actuating member 4. According to a prescribed program, the driving device 31 can then be moved, in control dependency of the control device, to the actuating member 4 of another shutoff valve, and this shutoff valve can be actuated accordingly.

The foregoing is a description corresponding in substance to German Application No. P 34 00 719.9, dated Jan. 11, 1984, the International priority of which is being claimed for the instant application, and which is hereby made part of this application. Any material discrepancies between the foregoing specification and the aforementioned corresponding German application are to be resolved in favor of the latter.

We claim:

1. Glove box with tubular lines for harmful fluids and with shutoff valves inserted in the tubular lines and, respectively, formed of an actuating member and a valve body, comprising an exterior wall forming part of the glove box, the shutoff valves being disposed adjacent one another on said wall, the tubular lines and the valve bodies of the shutoff valves being located on the inside of said exterior wall, and the actuating members of the valve bodies being located on the outside of said exterior wall; and drive means for driving the actuating members also located on the outside of said exterior wall and having a device for docking with the respective actuating members, a pair of parallel rectilinear guide rails mounted on the outside of said exterior wall, another rectilinear guide rail formed as a slider extending perpendicularly to and being slidable on and along said pair of parallel guide rails, said drive means, in turn, being slidable on and along said other rectilinear guide, said drive means being thereby guidably displaceable in a plane parallel to said exterior wall to the respective actuating members for docking with the respective actuating members.

2. Glove box according to claim 1 wherein the tubular lines include rectilinear main tubes whereon the valve bodies are seated, said main tubes extending spaced from and parallel to one another on the inner surface of said exterior wall.

3. Glove box according to claim 1 wherein said drive means comprise a sensor for detecting the setting of a respective actuating member and for adjusting the setting of said docking device for docking with the actuating member at the respective setting.

4. Glove box according to claim 1 wherein said docking device comprises a sensor for detecting a proper docking of said drive means with the actuating member.

5. Glove box according to claim 1 wherein the tubular lines are tubes.

6. Glove box according to claim 1 wherein the tubular lines are hose lines.

* * * * *